United States Patent
Popa et al.

(10) Patent No.: US 11,520,663 B2
(45) Date of Patent: Dec. 6, 2022

(54) TECHNIQUES FOR ANALYTICAL APPLICATION INSTALLATION OPTIMIZATION

(71) Applicant: WATERS TECHNOLOGIES IRELAND LIMITED, Dublin (IE)

(72) Inventors: Coralia Popa, Brasov (RO); Kinga Peter-Siskovits, Brasov (RO); Ildiko Niculescu, Brasov (RO); Marius Petrica Gheorghita, Brasov (RO); Alexandru Ungureanu, Brasov (RO); Richard Woodhead, Holmes Chapel (GB)

(73) Assignee: WATERS TECHNOLOGIES IRELAND LIMITED, Dublin (IE)

( * ) Notice: Subject to any disclaimer, the term of this patent is extended or adjusted under 35 U.S.C. 154(b) by 25 days.

(21) Appl. No.: 17/012,770

(22) Filed: Sep. 4, 2020

(65) Prior Publication Data
US 2021/0064472 A1  Mar. 4, 2021

Related U.S. Application Data

(60) Provisional application No. 62/895,589, filed on Sep. 4, 2019.

(51) Int. Cl.
*G06F 11/14* (2006.01)
*G06F 11/32* (2006.01)
(Continued)

(52) U.S. Cl.
CPC ............ *G06F 11/1433* (2013.01); *G06F 8/61* (2013.01); *G06F 11/0787* (2013.01);
(Continued)

(58) Field of Classification Search
None
See application file for complete search history.

(56) References Cited

U.S. PATENT DOCUMENTS 6,330,653 B1 * 12/2001 Murray ................. G06F 3/0605
                                                      711/173
2006/0224544 A1 * 10/2006 Keith ....................... G06N 5/04
                                                        706/60
(Continued)

OTHER PUBLICATIONS

"UNIFI—Installation and Configuration Guide," Aug. 27, 2015, Waters Corp., p. 1-144. (Year: 2015).*

*Primary Examiner* — Qing Chen
(74) *Attorney, Agent, or Firm* — Goodwin Procter LLP

(57) ABSTRACT

Techniques and apparatus for installation optimization process are described. In one embodiment, for example, an computing device may include at least one memory; at least one storage device; and logic coupled to the at least one memory to perform an installation process, the logic to: determine installation requirements for an analytical platform, the installation platform comprising at least one of an analytical application, a database application, and a fast recovery area (FRA), perform at least one prerequisite test based on a hardware configuration of the computing device and the installation requirements, and perform a drive optimization process to determine at least one optimal drive configuration for installation of the installation platform based on remaining free space (RFS) on the at least one storage device and at least one storage device installation rule. Other embodiments are described.

20 Claims, 15 Drawing Sheets

(51) Int. Cl.
  *G06F 11/07* (2006.01)
  *G06F 8/61* (2018.01)
  *G06F 11/30* (2006.01)

(52) U.S. Cl.
  CPC ...... *G06F 11/1464* (2013.01); *G06F 11/1469* (2013.01); *G06F 11/3034* (2013.01); *G06F 11/328* (2013.01); *G06F 2201/80* (2013.01)

(56) References Cited

U.S. PATENT DOCUMENTS

| | | | | |
|---|---|---|---|---|
| 2009/0089778 | A1* | 4/2009 | Craft | G06F 8/61 |
| | | | | 717/174 |
| 2009/0094433 | A1* | 4/2009 | Thomas | G06F 3/0679 |
| | | | | 711/172 |
| 2012/0278900 | A1* | 11/2012 | Sebald | G06F 11/3604 |
| | | | | 726/28 |
| 2015/0178072 | A1* | 6/2015 | Bektas | G06F 8/61 |
| | | | | 717/123 |
| 2019/0004782 | A1* | 1/2019 | Maruyama | G06F 16/955 |
| 2019/0050422 | A1* | 2/2019 | Ono | G06Q 50/26 |

\* cited by examiner

| COMPONENTS | DRIVE 1 | 502 |
|---|---|---|
| OS | YES | |
| DB APPLICATION | | FREE SPACE > 40G ALL COMPONENTS WILL BE INSTALLED ON THE SAME DRIVE ALONG WITH THE OS |
| FRA | | FREE SPACE <= 40G (STOP CONDITION) |
| ANALYTICAL APPLICATION | | |

| COMPONENTS | | DRIVE 1 | DRIVE 2 |
|---|---|---|---|
| OS | | YES | |
| DB APPLICATION | OPTION 1 | IF RFS DRIVE1 > 20G | |
| | OPTION 2 | | IF RFS DRIVE1 < 20G AND RFS DRIVE2 > 20G |
| FRA | OPTION 1 | | IF FRA REQUIRED AND RFS DRIVE2 > 5G (AND NOT DB APPLICATION) |
| | OPTION 2 | IF FRA REQUIRED AND RFS DRIVE2 < 5G AND RFS DRIVE1 > 5G (AND NOT DB APPLICATION) | |
| ANALYTICAL APPLICATION | OPTION 1 | IF RFS DRIVE1 > 15G (AND NOT DB APPLICATION) | |
| | OPTION 2 | | IF RFS DRIVE1 < 15G AND RFS DRIVE2 > 15G (AND NOT DB APPLICATION) |

502

| COMPONENTS | | DRIVE 1 | DRIVE 2 | DRIVE 3 |
|---|---|---|---|---|
| OS | | YES | | |
| DB APPLICATION | OPTION 1 | | IF RFS DRIVE2 > 20G | |
| | OPTION 2 | | | IF RFS DRIVE2 < 20G AND RFS DRIVE3 > 20G |
| | OPTION 3 | IF RFS DRIVE2 < 20G AND RFS DRIVE3 < 20G AND RFS DRIVE1 > 20G | | |
| FRA | OPTION 1 | | | IF FRA REQUIRED AND RFS DRIVE3 > 5G (AND NOT DB APPLICATION) |
| | OPTION 2 | | IF FRA REQUIRED AND RFS DRIVE3 < 5G AND RFS DRIVE2 > 5G (AND NOT DB APPLICATION) | |
| | OPTION 3 | IF FRA REQUIRED AND RFS DRIVE2 < 5G AND RFS DRIVE3 < 5G AND RFS DRIVE3 > 5G (AND NOT DB APPLICATION) | | |
| ANALYTICAL APPLICATION | OPTION 1 | IF RFS DRIVE1 > 15G (AND NOT DB APPLICATION) | | |
| | OPTION 2 | | IF RFS DRIVE2 > 15G AND RFS DRIVE1 < 15G (AND NOT DB APPLICATION) | |
| | OPTION 3 | | | IF RFS DRIVE1 < 15G AND RFS DRIVE2 < 15G AND RFS DRIVE3 > 15G (AND NOT DB APPLICATION) |

| COMPONENTS | | DRIVE 1 | DRIVE 2 | DRIVE 3 | DRIVE 4 |
|---|---|---|---|---|---|
| OS | | YES | | | |
| DB APPLICATION | OPTION 1 | | IF RFS DRIVE2 > 20G | | |
| | OPTION 2 | | | IF RFS DRIVE2 < 20G AND RFS DRIVE3 >20G | |
| | OPTION 3 | | | | IF RFS DRIVE2 < 20G AND RFS DRIVE3 < 20G AND RFS DRIVE4 > 20G |
| | OPTION 4 | IF RFS DRIVE 2,3,4 < 20G AND RFS DRIVE1 > 20G | | | |
| ANALYTICAL APPLICATION | OPTION 1 | | | | IF RFS DRIVE4 > 15G AND NOT DB APPLICATION |
| | OPTION 2 | | IF RFS DRIVE4 < 15G AND RFS DRIVE2 > 15G (AND NOT DB APPLICATION) | | |
| | OPTION 3 | | | IF RFS DRIVE2,4 < 15G AND RFS DRIVE3 > 15G (AND NOT DB APPLICATION) | |
| | OPTION 4 | IF RFS DRIVE2,3,4 < 15G AND RFS DRIVE1 > 15G (AND NOT DB APPLICATION) | | | |

TECHNIQUES FOR ANALYTICAL APPLICATION INSTALLATION OPTIMIZATION

CROSS-REFERENCE TO RELATED APPLICATIONS

This application claims the benefit of and priority to U.S. Provisional Patent Application No. 62/895,589, filed on Sep. 4, 2019, the entire contents of which is hereby incorporated by reference.

BACKGROUND

Analytical instruments, such as mass spectrometry (MS) instruments and liquid chromatography (LC) systems, require robust, specialized software platforms to operate and process analytical data. The software platforms require proper installation environments in order to maximize performance and processing efficiency. Conventional systems do not include effective mechanisms for enforcement of installation requirements and/or optimizing an installation for a particular computing architecture. Accordingly, operators are typically running analytical instruments using software platforms that are installed erroneously and/or are installed under sub-optimal operating configurations.

SUMMARY

In accordance with various aspects of the described embodiments is a computing device, comprising at least one memory, at least one storage device; and logic coupled to the at least one memory to perform an installation process. In some embodiments, the logic may determine installation requirements for an analytical platform, the installation platform comprising at least one of an analytical application, a database application, and a fast recovery area (FRA), perform at least one prerequisite test based on a hardware configuration of the computing device and the installation requirements, and perform a drive optimization process to determine at least one optimal drive configuration for installation of the installation platform based on remaining free space (RFS) on the at least one storage device and at least one storage device installation rule.

In some embodiments of the computing device, the logic may stop installation of the analytical platform responsive to a mandatory condition determined during the at least one prerequisite test.

In various embodiments of the computing device, the mandatory condition may include insufficient FRS.

In exemplary embodiments of the computing device, the logic may display the mandatory condition via an installation test report graphical user interface (GUI) with mandatory condition information indicating a storage device and FRS information that is a source of the mandatory condition.

In some embodiments of the computing device, the at least one storage device rule may include one of analytical application installed on a separate storage location from OS, analytical application installed on a separate storage location database application, database application installed on a separate storage location from OS, FRA installed on a separate storage location from OS, and FRA installed on a separate storage location from database application.

In exemplary embodiments of the computing device, the logic may determine a drive partition for installation of at least one component of the analytical platform.

In various embodiments of the computing device, the logic may receive a user-specified installation path for at least one component of the analytical platform, and perform the drive optimization process using the user-specified installation path.

In some embodiments of the computing device, the at least one storage device may include a plurality of storage devices, the logic may perform the drive optimization process to determine a plurality of options for each of the plurality of storage devices.

In accordance with various aspects of the described embodiments is a computer-implemented method to implement an installation process on at least one storage device of a computing device. In some embodiments, the computer-implemented method may include, via a processor of the computing device, determining installation requirements for an analytical platform, the installation platform comprising at least one of an analytical application, a database application, and a fast recovery area (FRA), performing at least one prerequisite test based on a hardware configuration of the computing device and the installation requirements, and performing a drive optimization process to determine at least one optimal drive configuration for installation of the installation platform based on remaining free space (RFS) on the at least one storage device and at least one storage device installation rule.

In some embodiments of the method, the method may include stopping installation of the analytical platform responsive to a mandatory condition determined during the at least one prerequisite test.

In various embodiments of the method, the mandatory condition may include insufficient FRS.

In exemplary embodiments of the method, the method may include displaying the mandatory condition via an installation test report graphical user interface (GUI) with mandatory condition information indicating a storage device and FRS information that is a source of the mandatory condition.

In some embodiments of the method, the at least one storage device rule may include one of analytical application installed on a separate storage location from OS, analytical application installed on a separate storage location database application, database application installed on a separate storage location from OS, FRA installed on a separate storage location from OS, and FRA installed on a separate storage location from database application.

In exemplary embodiments of the method, the method may include determining a drive partition for installation of at least one component of the analytical platform.

In various embodiments of the method, the method may include receiving a user-specified installation path for at least one component of the analytical platform, and performing the drive optimization process using the user-specified installation path.

In some embodiments of the method, the at least one storage device may include a plurality of storage devices, and the method may include performing the drive optimization process to determine a plurality of options for each of the plurality of storage devices.

In accordance with various aspects of the described embodiments is a non-transitory computer-readable medium storing instructions that, when executed, cause one or more processors to implement an installation process on at least one storage device of a computing device to determine installation requirements for an analytical platform, the installation platform comprising at least one of an analytical application, a database application, and a fast recovery area (FRA), perform at least one prerequisite test based on a hardware configuration of the computing device and the installation requirements, and perform a drive optimization process to determine at least one optimal drive configuration for installation of the installation platform based on remaining free space (RFS) on the at least one storage device and at least one storage device installation rule.

In some embodiments of the non-transitory computer-readable medium, the instructions, when executed, may cause one or more processors to implement an installation process on the computing device to stop installation of the analytical platform responsive to a mandatory condition determined during the at least one prerequisite test, the mandatory condition may include insufficient FRS.

In various embodiments of the non-transitory computer-readable medium, the at least one storage device rule may include one of analytical application installed on a separate storage location from OS, analytical application installed on a separate storage location database application, database application installed on a separate storage location from OS, FRA installed on a separate storage location from OS, and FRA installed on a separate storage location from database application.

In some embodiments of the non-transitory computer-readable medium, the at least one storage device may include a plurality of storage devices and the instructions, when executed, may cause one or more processors to implement an installation process on the computing device to perform the drive optimization process to determine a plurality of options for each of the plurality of storage devices.

BRIEF DESCRIPTION OF THE DRAWINGS

FIGS. 5A-5D illustrate optimal installation configurations according to some embodiments.

DETAILED DESCRIPTION

Figure 1:
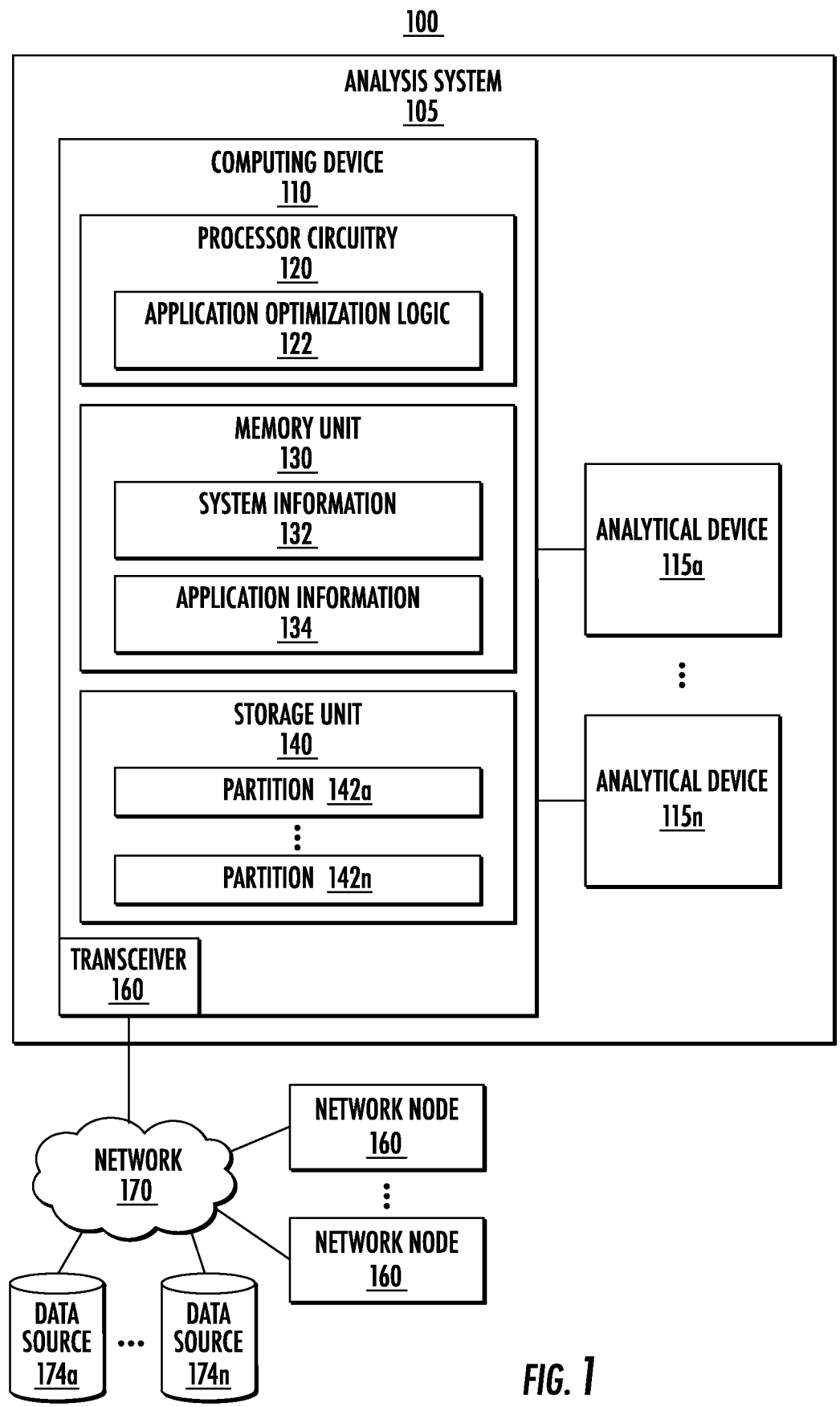
FIG. 1 illustrates an embodiment of a first operating environment.

Various embodiments may generally be directed toward systems, methods, computer-readable mediums, and/or apparatus for optimizing installation of an analytical application. In some embodiments, the analytical application may be an application for controlling, managing, running, or otherwise interacting with a mass analysis analytical device and/or components thereof. A non-limiting example of an analytical application may include the UNIFI™ scientific information system provided by Waters Corporation of Milford, Mass., United States of America.

Analytical instruments, such as mass analysis devices, generate large volumes of analytical information. Storing and processing the analytical information is increasingly becoming a challenge and bottleneck for obtaining accurate, efficient results. A major component of improving the efficiency of data processing methods of analytical software is the proper installation and partitioning of the software components, associated databases, and/or the like. A software application installed sub-optimally may perform less efficiently on a computing device than the same software application installed optimally. For example, lack of free space and installation of software components (for instance, an OS, analytical application, and/or a database application) on the same disk or disk partition may lead to slow processing times and competition for resources. However, conventional analytical software is not capable of adequately determining an optimal installation on a case-by-case basis. Rather, developers typically provide default installation locations and a static listing of optimal operating conditions, memory requirements, processor requirements, and/or the like that is not customized to a particular installation site and computing devices. Therefore, users of conventional analytical software typically do not have an optimal installation and, as a result, experience inefficient data procurement and/or processing, costing computing resources and laboratory time.

Accordingly, some embodiments may provide processes for determining an optimal installation configuration on a case-by-case basis individualized for specific computing devices and to ensure an optimal configuration is installed. In various embodiments, the software optimization process may operate to determine "intelligent" or "smart" installation defaults for analytical software on individual hardware/software configurations in the field. In some embodiments, the software optimization process may enforce mandatory installation conditions and/or provide selections for optional conditions. In some embodiments, a software optimization process may perform a hardware inventory (or check), such as a check of storage drives, drive partitions, remaining free space (RFS) on a drive, component installation locations, and/or the like. In some embodiments, the software optimization process may determine a set of options for optimizing installation of a suite of software components on the hardware configuration including, for example, installation of software with an optimal-drives combination of software components. Non-limiting examples of software components may include an analytical application (for instance, UNIFI), an operating system (OS), a database application (for instance, an Oracle® database application), a fast recovery area, modules thereof, and/or the like. In some embodiments, the software optimization processes may include determining installation paths for software applications and/or components thereof. In some embodiments, the software optimization processes may include determining communication configuration for software applications and/or components thereof.

Therefore, some embodiments may provide a plurality of technological advantages over conventional systems, including improvements to computing technology. One non-limiting technological advantage includes providing software optimization processes to determine an optimal installation for a particular suite of analytical software components on a specific set of hardware. In this manner, analytical systems using analytical software installed using software optimization processes according to some embodiments may perform more efficiently, require fewer resources, and provide more timely analytical results compared with analytical software installed using conventional techniques.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include an analysis system 105 operative to manage analytical data associated with analytical devices 115a-n. In some embodiments, analytical devices 115a-n may be or may include a chromatography system, a liquid chromatography (LC) system, a gas chromatography (GC) system, a mass analyzer system, a mass spectrometer (MS) system, an ion mobility spectrometer (IMS) system, a high-performance liquid chromatography (HPLC) system, a ultra-performance liquid chromatography (UPLC®) system, a ultra-high performance liquid chromatography (UHPLC) system, a solid-phase extraction system, a sample preparation system, a heater (for example, a column heater), a sample manager, a solvent manager, an in vitro device (IVD), combinations thereof, components thereof, variations thereof, and/or the like.

In various embodiments, analysis system 105 may include computing device 110 communicatively coupled to analytical devices 115a-n. Computing device 110 may be operative to communicate with, control, monitor, manage, or otherwise process various operational functions of analytical devices 115a-n. Computing device 110 may obtain analytical information directly via data sources 174a-n and/or directly from analytical devices 115a-n.

In some embodiments, computing device 110 may be or may include a stand-alone computing device, such as a personal computer (PC), server, tablet computing device, cloud computing device, and/or the like. In some embodiments, computing device 110 may be a separate device from analytical devices 115a-n. In other embodiments, computing device 110 may be a part, such as an integrated controller, of analytical devices 115a-n. In various embodiments, computing device 110 may be operative to receive, access, or otherwise obtain analytical information generated via one or more of analytical devices 115a-n.

In some embodiments, an analytical application may be installed on computing device 110 to manage, control, or otherwise interact with analytical devices 115a-n and/or analytical information generated by analytical devices 115a-n. A non-limiting example of an analytical application may include UNIFI™, variations thereof, components thereof, and/or the like. In some embodiments, analytical application may interact with various other software components, such as a database or database client application, such as an Oracle® database or client application. Software optimization processes according to some embodiments may be employed during installation of an analytical application and/or a database to optimize the operation thereof.

As shown in FIG. 1, computing device 110 may include processing circuitry 120, a memory unit 130, and a transceiver 160. Processing circuitry 120 may be communicatively coupled to memory unit 130 and/or transceiver 160.

Processing circuitry 120 may include and/or may access various logic for performing processes according to some embodiments. For instance, processing circuitry 120 may include and/or may access application optimization logic 122. Processing circuitry 120 and/or application optimization logic 122, or portions thereof, may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 1000. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

Although application optimization logic 122 is depicted in FIG. 1 as being within processing circuitry 120, embodiments are not so limited. For example, application optimization logic 122, and/or any component thereof, may be located within an accelerator, a processor core, an interface, an individual processor die, implemented entirely as a software application.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 130 may store system information 132 and/or application information 134. In some embodiments, system information 132 may include hardware and/or software information associated with computing device 110. Non-limiting examples of system information 132 may include storage device information (for instance, number, type, free space, partition information), operating system information, installation location information (for instance, OS installation drive/partition, database installation drive/partition, fast recovery area (FRA) drive/partition, and/or the like), processor information, memory information, and/or the like. Application information 134 may include information relating to the OS and software currently or previously installed on computing device 110 (including, for example, previous versions of analytical software). Embodiments are not limited in this context.

In various embodiments, application optimization logic 122 may operate to perform a software optimization process to optimize the installation of an analytical application and/or other software on computing device 110. In some embodiments, the software optimization process may be configured for different types of installations, such as single deployment (for instance, a single installation on a workstation) or a network deployment. Software optimization process may perform a series of prerequisite or installation tests. Non-limiting examples of prerequisite tests may include operating system checks, system bit configuration (for instance, 64-bit OS), operating system language/region, reboot pending check, user credentials, current installation active, and/or the like. Embodiments are not limited in this context.

Application optimization logic 122 may perform a software optimization process that may determine a plurality of prerequisite test results or conditions as a result of the tests, including mandatory conditions and optional (or warning) conditions. In some embodiments, mandatory conditions may include conditions that must be satisfied to initiate and/or continue installation. Non-limiting examples of mandatory conditions may include inadequate security credentials, insufficient hardware resources, insufficient free installation space, presence of previous version of software currently installed on the machine, reboot required, installation currently in progress, and/or the like. An optional condition may include a condition indicating a sub-optimal configuration wherein installation may continue. A non-limiting example of an optional condition may include hardware configurations that are sub-optimal but sufficient to allow installation to proceed.

Figure 2:
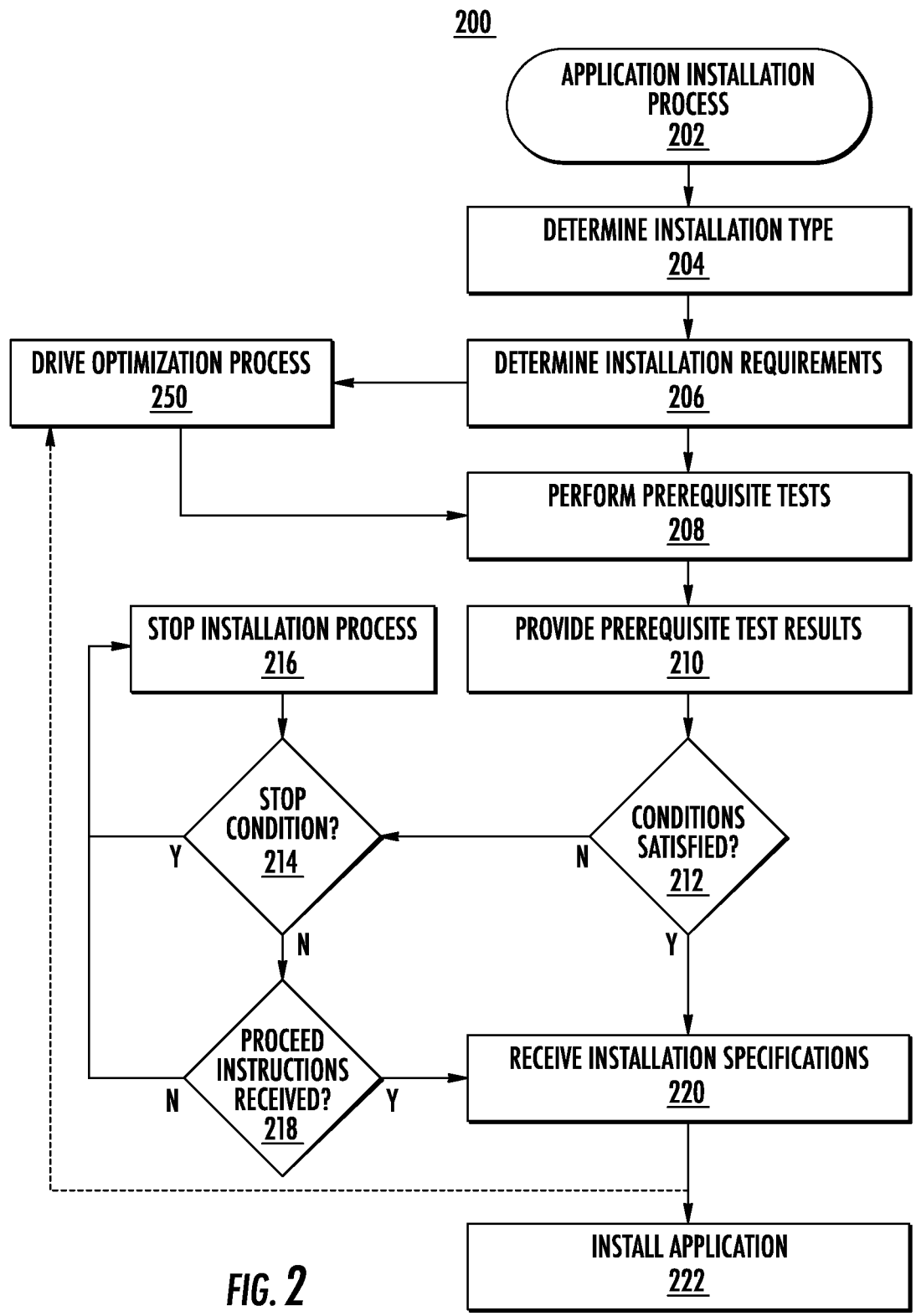
FIG. 2 illustrates a first logic flow according to some embodiments.
Figure 3:
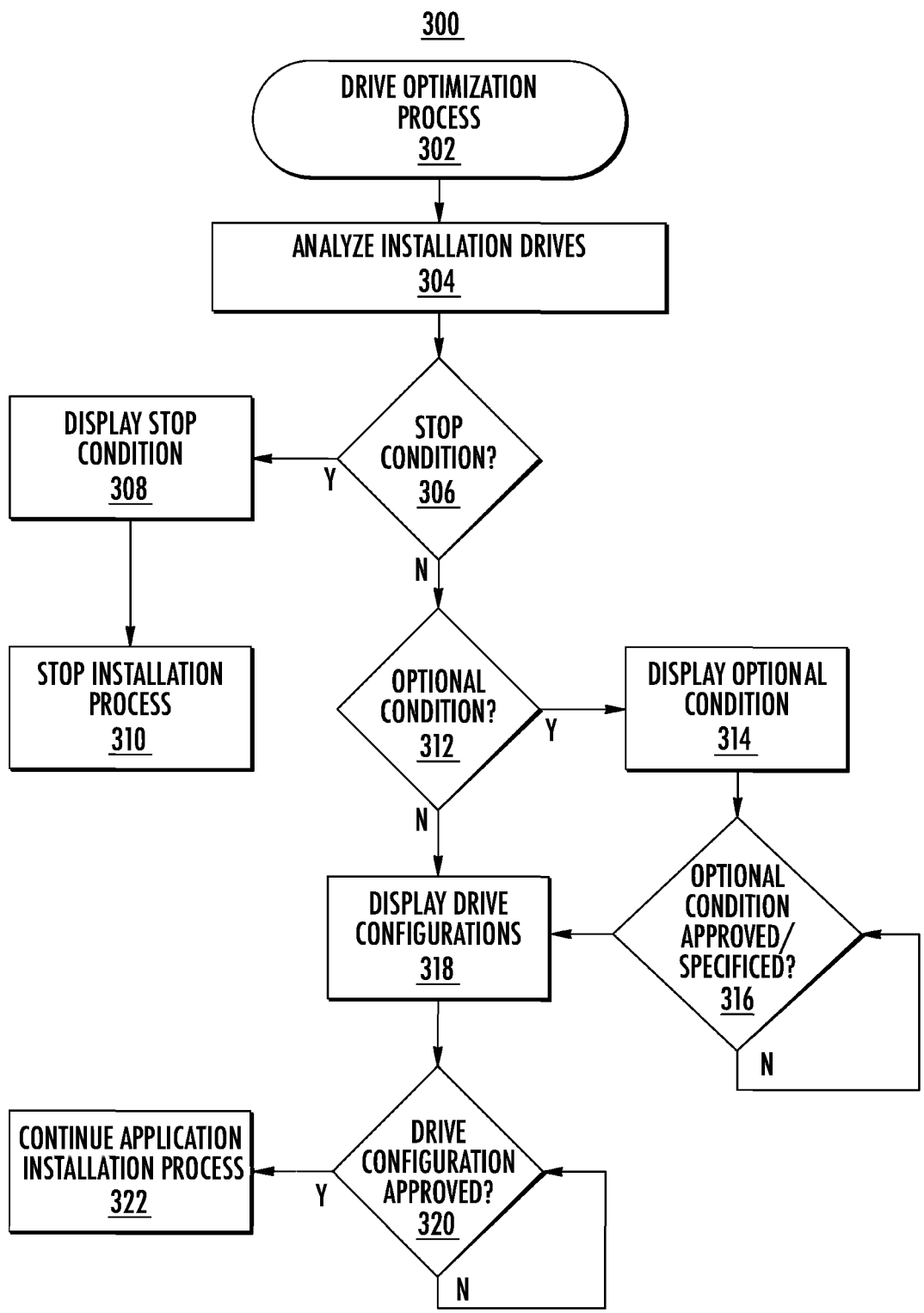
FIG. 3 illustrates a second logic flow according to some embodiments.

In some embodiments, application optimization logic 122 may perform an application installation process and a drive optimization process, for example, as depicted in FIGS. 2 and 3, respectively.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

FIG. 2 illustrates an embodiment of a logic flow 200. Logic flow 200 may be representative of some or all of the operations executed by one or more embodiments described herein, such as computing device 110. In some embodiments, logic flow 200 may be representative of some or all of the operations of an application installation process performed via application optimization logic 122.

At block 202, logic flow 200 may start an application installation process. The application installation process may be to install an analytical application and/or associated components on a computing device. In some embodiments, the application installation process may install an analytical platform that may include an analytical application (platform services), a database (DB) application, and/or a FRA. Logic flow 200 may determine an installation type at block 204. For example, an installation type may be a single deployment installation, a network installation, a partial installation, and/or the like. At block 206, logic flow 200 may determine installation requirements for the installation based, at least in part on the installation type. For example, application requirements may include OS type, minimum hardware requirements, RFS requirements, and/or the like. For example, a DB application may require about 30 GB (including FRA) and an analytical application may require about 50 GB. In addition, requirements may include a minimum amount of RFS on the storage device and/or partitions thereof after installation of the analytical application, DB application, RFA, and/or the like.

Logic 200 may perform a drive optimization process at block 250 (see, for example, FIG. 3). For example, application optimization logic 122 may determine sets of possible drive installation configurations, which may include an optimal or recommended drive installation configuration. The drive installation configurations may be based on required free space and various storage device installation rules including, without limitation, analytical application (or platform server of analytical application) separate from OS; analytical application separate from database application; database application separate from OS; FRA separate from OS; and/or FRA separate from database application. In some embodiments, the required free space may be determined based on various benchmark tests for the software components on test computing device configurations. The installation locations and/or installation paths may be determined based on the computing device configuration according to some embodiments. Accordingly, on computing devices with different configurations (for instance, different number and size of drives, different partitioning, and/or the like) and different amounts of free disk space may have different suggested/required installation paths.

Figure 4A:
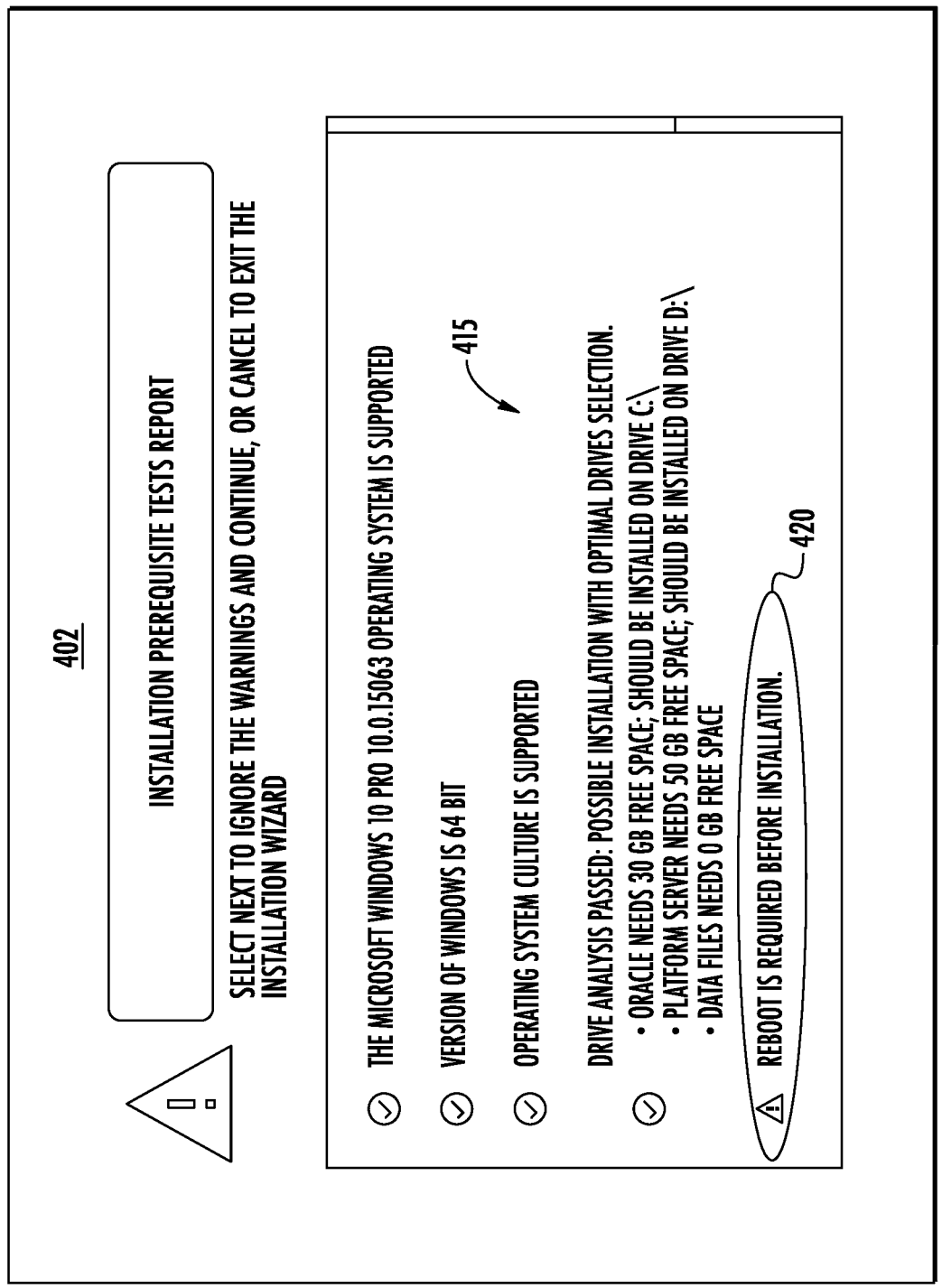
FIGS. 4A-4G illustrate application installation graphical user interfaces according to some embodiments.
Figure 4B:
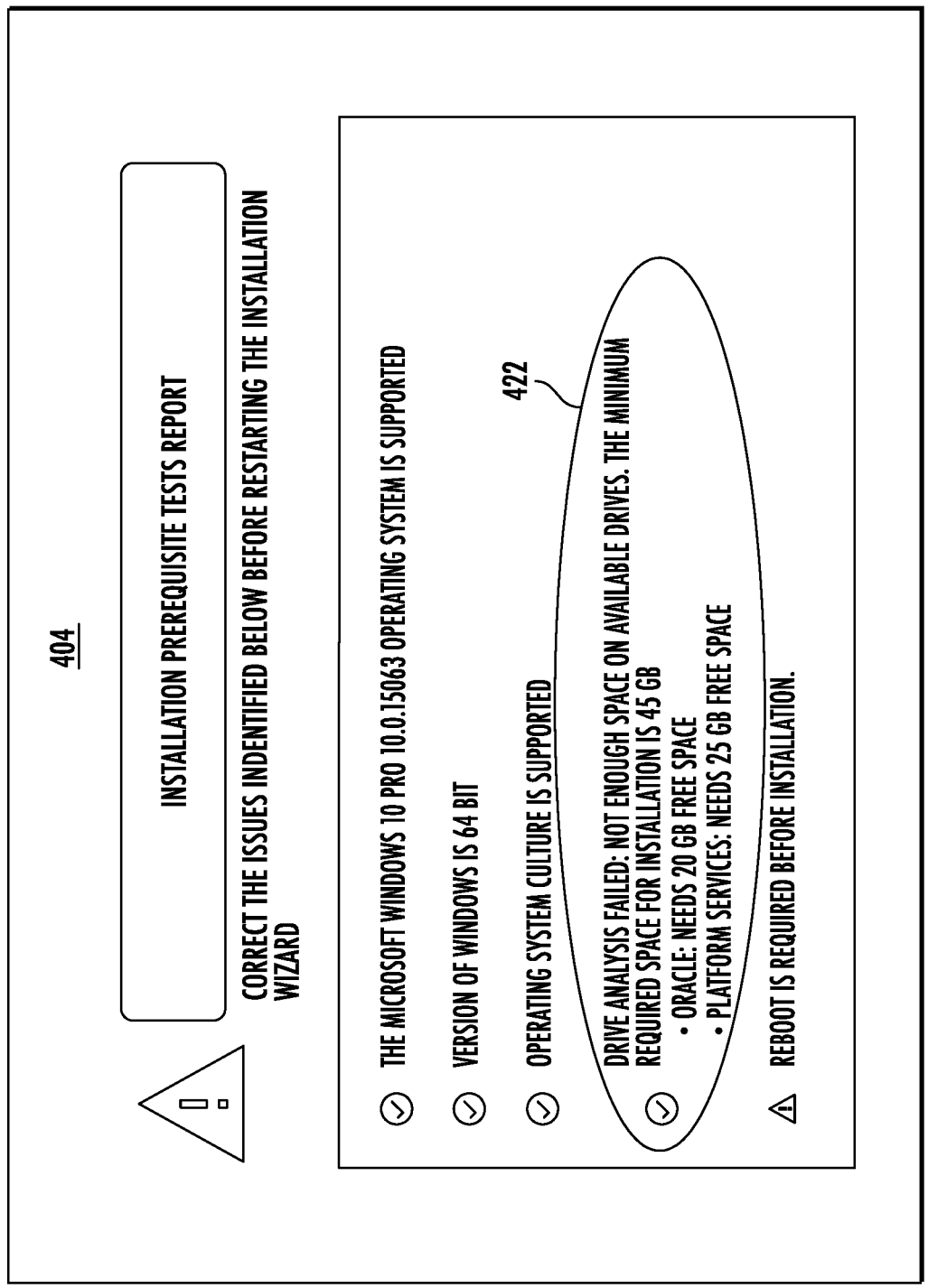
Figure 4C:
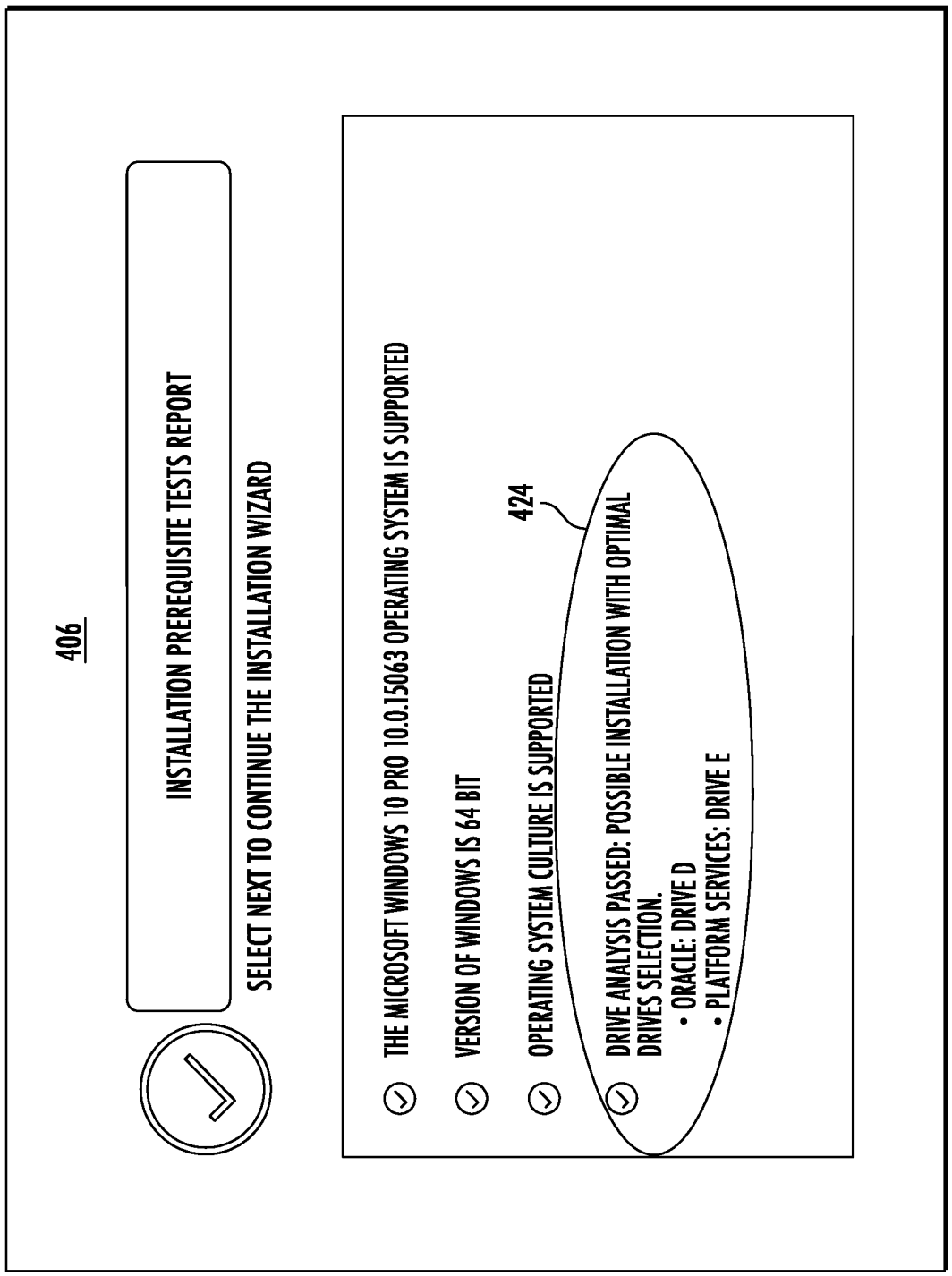

At block 208, logic flow 200 may perform the prerequisite tests. For example, application optimization logic 122 may analyze the hardware and software configuration of computing device 110 to determine if the prerequisite conditions have been satisfied. At block 210, prerequisite test results may be provided by logic flow 200. For example, as depicted in FIGS. 4A-4F, one or more graphical user interfaces (GUI) may be presented during to a user indicating the prerequisite test results. As shown in FIG. 4A an installation prerequisite tests report 402 may be presented indicating acceptable conditions 415 (green checkmark) that have passed and a mandatory condition 420 indicating that a reboot is required before installation may continue. Referring to FIG. 4B, therein is depicted an installation prerequisite tests report 402 a drive analysis mandatory condition 422. Violation or mandatory condition information may be displayed within installation prerequisite tests report 402 (for instance, the amount of disk space required for each installation component and a total amount of disk space required) indicating violations that triggered the mandatory condition. FIG. 4C depicts an installation prerequisite tests report 406 where all conditions have passed, including a drive analysis condition 424.

Figure 4D:
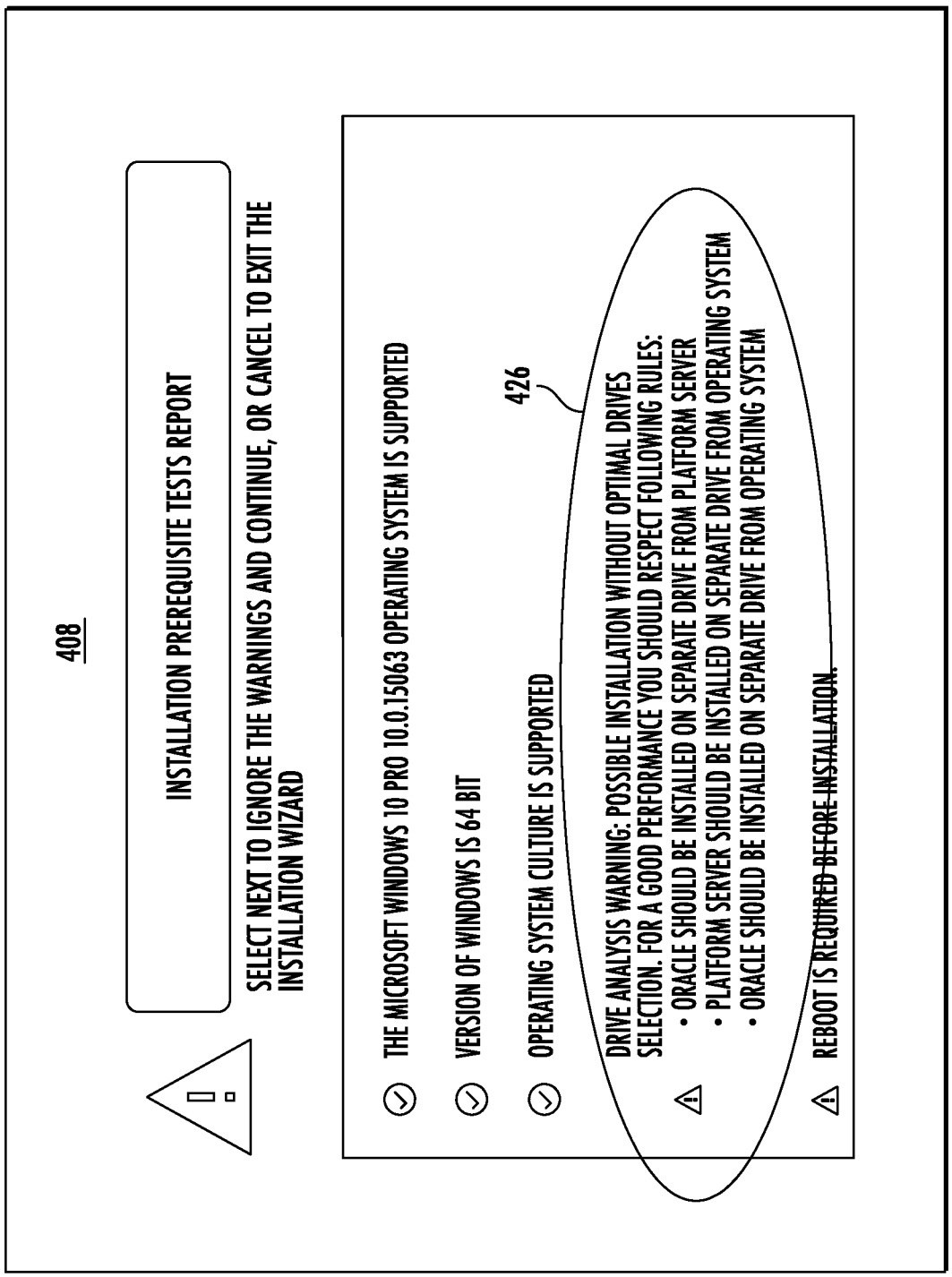

Logic flow 200 may determine whether the installation conditions have been satisfied at block 212. If the installation conditions have not been satisfied, logic flow 200 may determine whether a stop condition has occurred at block 214. If a stop condition has occurred, logic flow 200 may stop the installation process at block 216 while the stop condition is active. If the installation condition is an optional condition, logic flow 200 may determine whether instructions to proceed have been received at block 218. Referring to FIG. 4D, an optional condition 426 may be presented via installation prerequisite tests report 408. For example, a possible non-optimal installation drive condition has been detected. In some embodiments, condition 426 may include condition information, such as the reasons for flagging the condition (i.e., optimal installation rules that have been violated). The user may elect to proceed with the optional condition and/or provide installation specifications, for example, an alternative drive configuration or installation path.

Figure 4E:
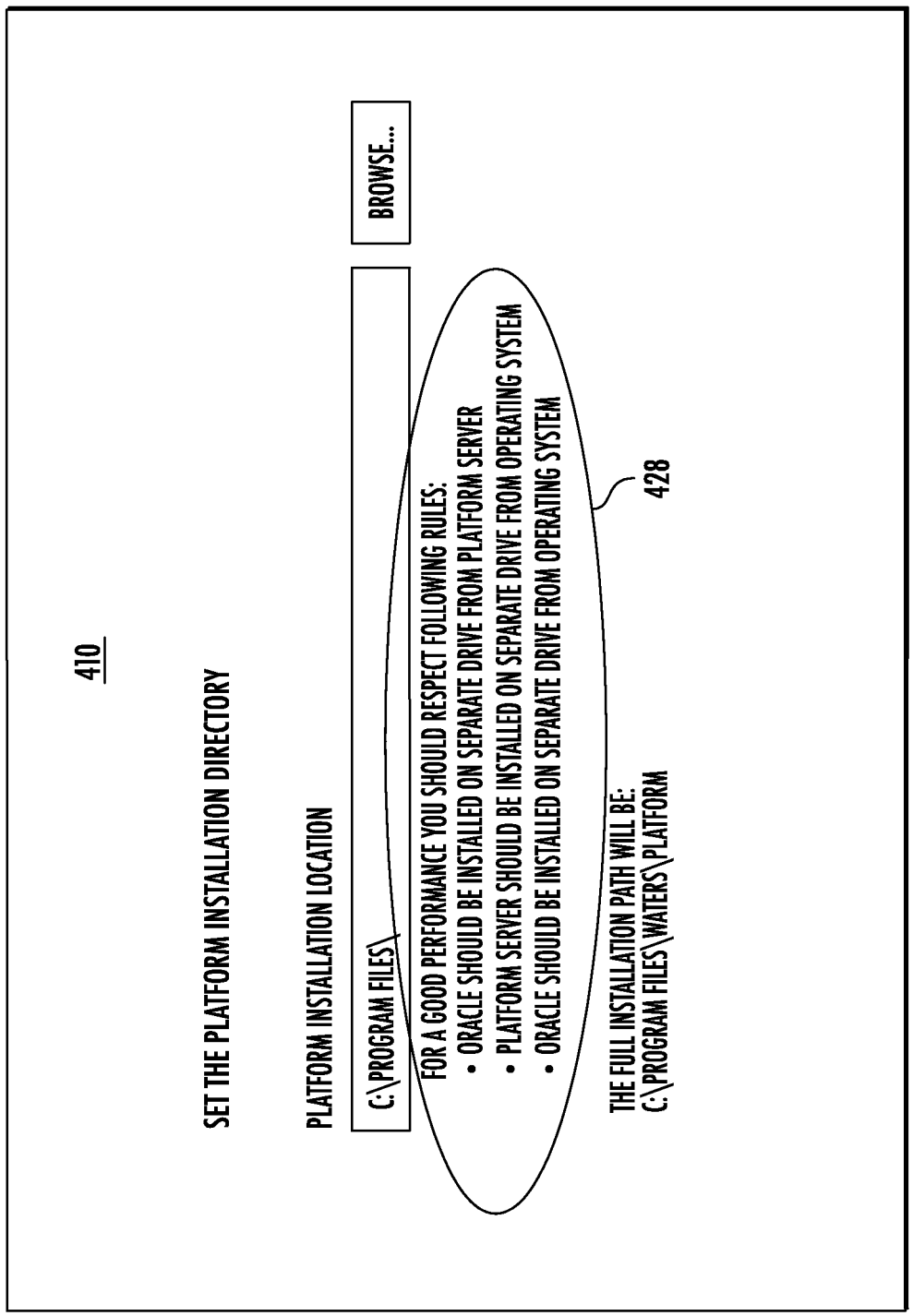
Figure 4F:
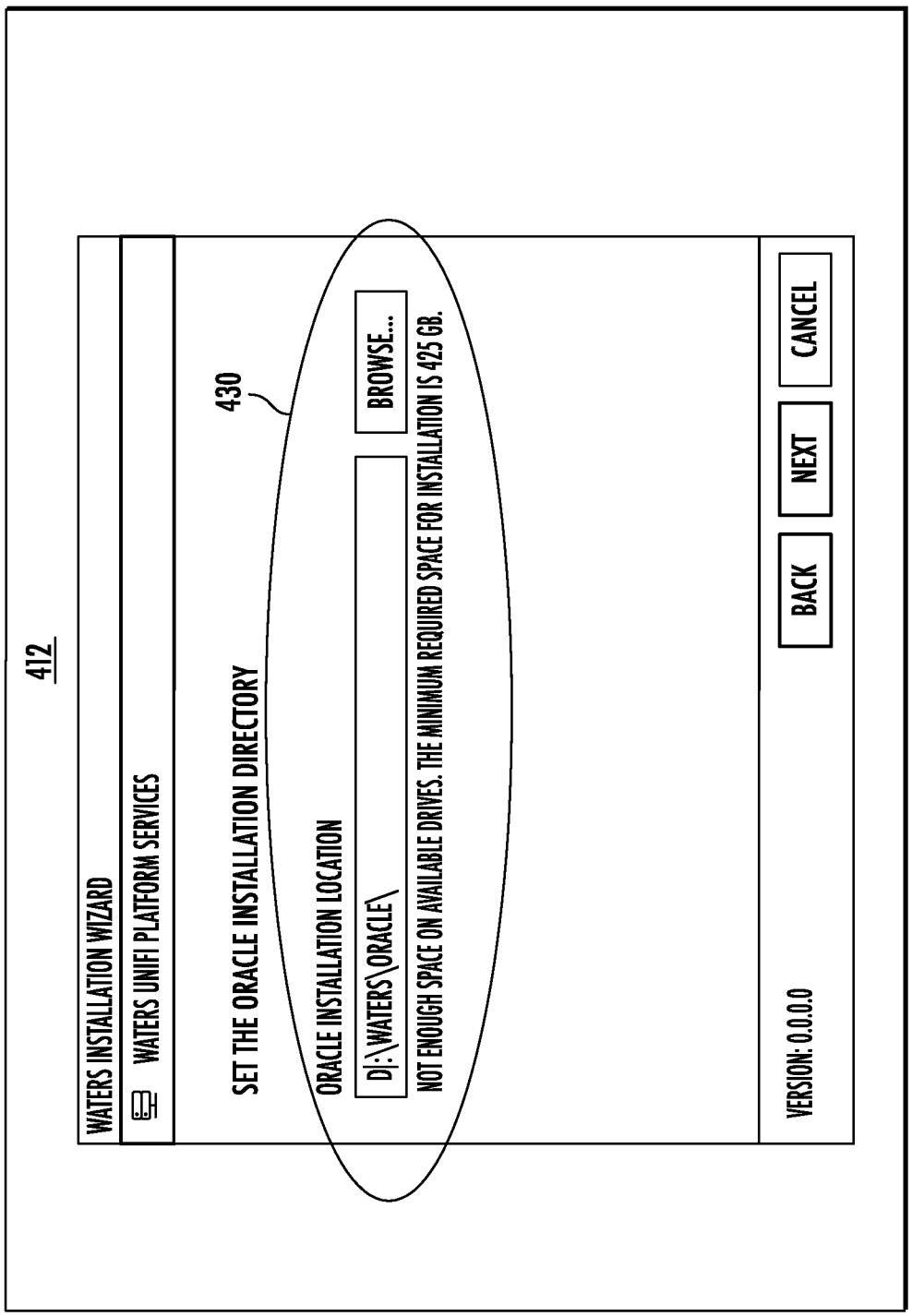

At block 220, logic flow 200 may receive installation specifications. Non-limiting examples of installation specifications may include installation directories, back up directories, communication settings (for instance, platform TCP port, platform HTTP port, application repository port, platform installation information port, batch service communication port, and/or the like), and/or the like. The installation specifications may be checked by the same prerequisite test conditions performed in block 208. For example, FIG. 4E depicts an installation specification GUI 410 displaying installation information 428 relating to specification of a platform installation specification. In another example, FIG. 4F depicts an installation specification GUI 412 displaying a mandatory condition violation 430 responsive to specification of an installation directory that violates the prerequisite conditions. At block 222, logic flow 200 may install the application(s) according to the installation specifications using the optimized drive configuration.

FIG. 3 illustrates an embodiment of a logic flow 300 of a drive optimization process. Logic flow 300 may be representative of some or all of the operations executed by one or more embodiments described herein, such as computing device 110. In some embodiments, logic flow 300 may be representative of some or all of the operations of a drive optimization process performed via application optimization logic 122.

At block 302, logic flow 300 may start a drive optimization process according to some embodiments. Logic flow 300 may analyze installation drives at block 304. For example, application optimization logic 122 may analyze the type of installation drives, drive partitions, software/OS storage locations, free space, and/or the like based on installation rules for system components. For example, an installation may involve installing an analytical application in an environment with an installed OS and/or database application with FRA capability. The drive installation configurations may be based on required free space (RFS) and various storage device installation rules including, without limitation, analytical application (or platform server of analytical application) separate from OS; analytical application separate from database application; database application separate from OS; FRA separate from OS; and/or FRA separate from database application. In some embodiments, the required free space may be determined based on various benchmark tests for the software components on test computing device configurations.

At block 306, logic flow 300 may determine whether there are any stop conditions, such as lack of sufficient free space on the target drives/partitions. If there are stop conditions, logic flow 300 may display the stop condition at block 308 (see, for example, FIG. 4B) and stop the installation process at block 310. Logic flow 300 may determine whether there are any optional conditions at block 312. If there are optional conditions, logic flow 300 may display the optional condition via a GUI at block 314 and determine whether the optional condition has been approved and/or specified by a user at block 316.

Figure 4G:
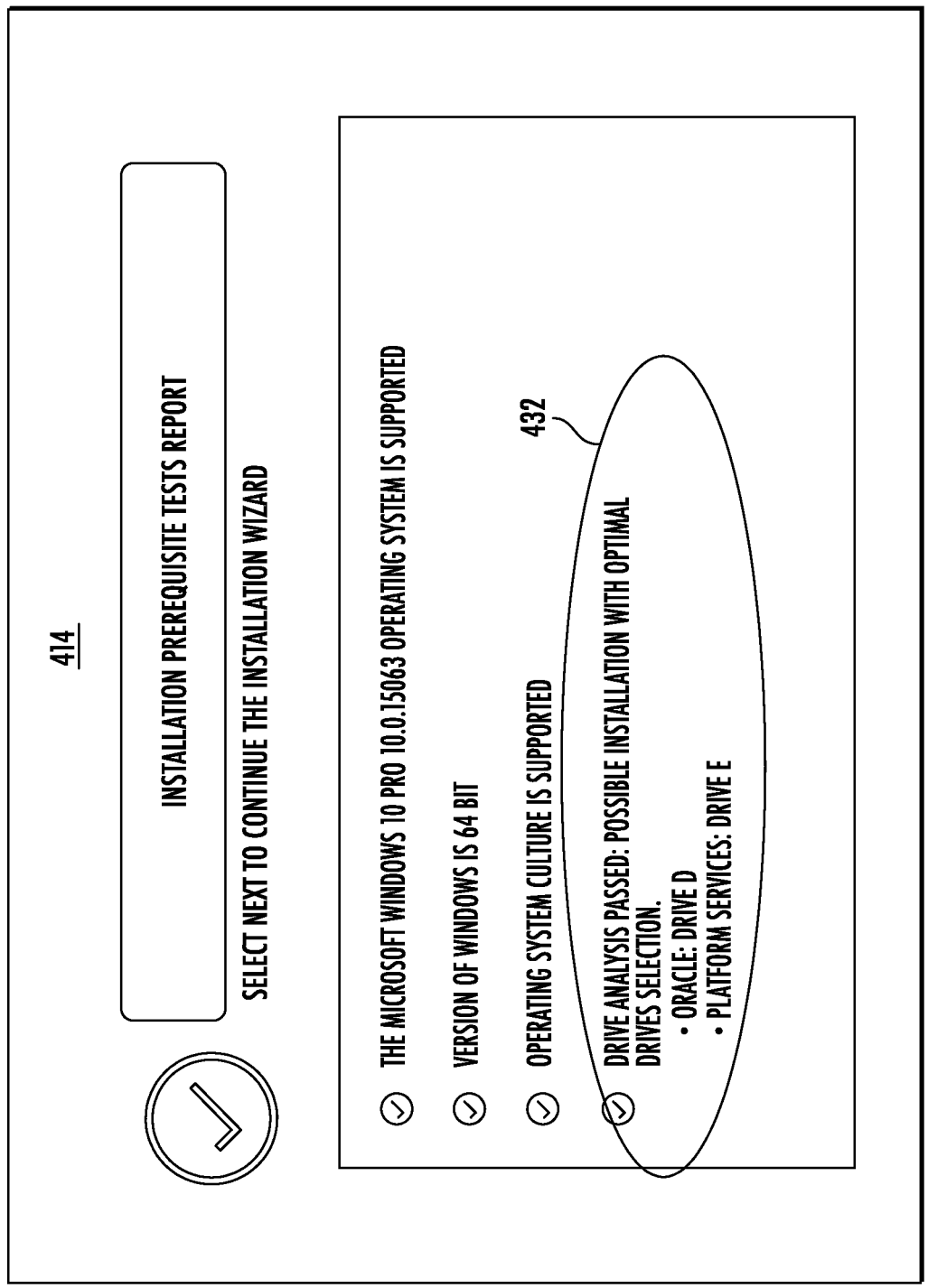

If there are not optional conditions or the optional condition has been approved/specified, logic floe 300 may display drive configurations at block 318. For example, FIG. 4G depicts an installation prerequisite tests report 414 with a drive analysis optimal drives selection 432 determined according to some embodiments. FIGS. 5A-5D depict drive configurations determined via drive optimization processes according to some embodiments for various number of drives, such as a one drive configuration options 502 (FIG. 5A), a two drive configuration options 504 (FIG. 5B), a three drive configuration options 506 (FIG. 5C), and a four drive configuration options 508 (FIG. 5D). Logic flow 300 may determine the drive configuration options based on the drive installation rules, RFS, and installation specifications (such as whether FRA is required, whether a database (DB) application is being installed, and/or the like). If a user changes an installation path, the prerequisite tests will be performed again for the selected installation path. In some embodiments, optimal drive configurations may include suggested disk partitioning. For example, application optimization logic 122 may determine that an optimal drive configuration may include a separate partition (including a partition that does not yet exist) for one or more installation components. The drive installation rules may be applied to each partition.

If a drive configuration is selected and/or approved at block 320, logic flow 300 may continue the application installation process at block 322.

Figure 6:
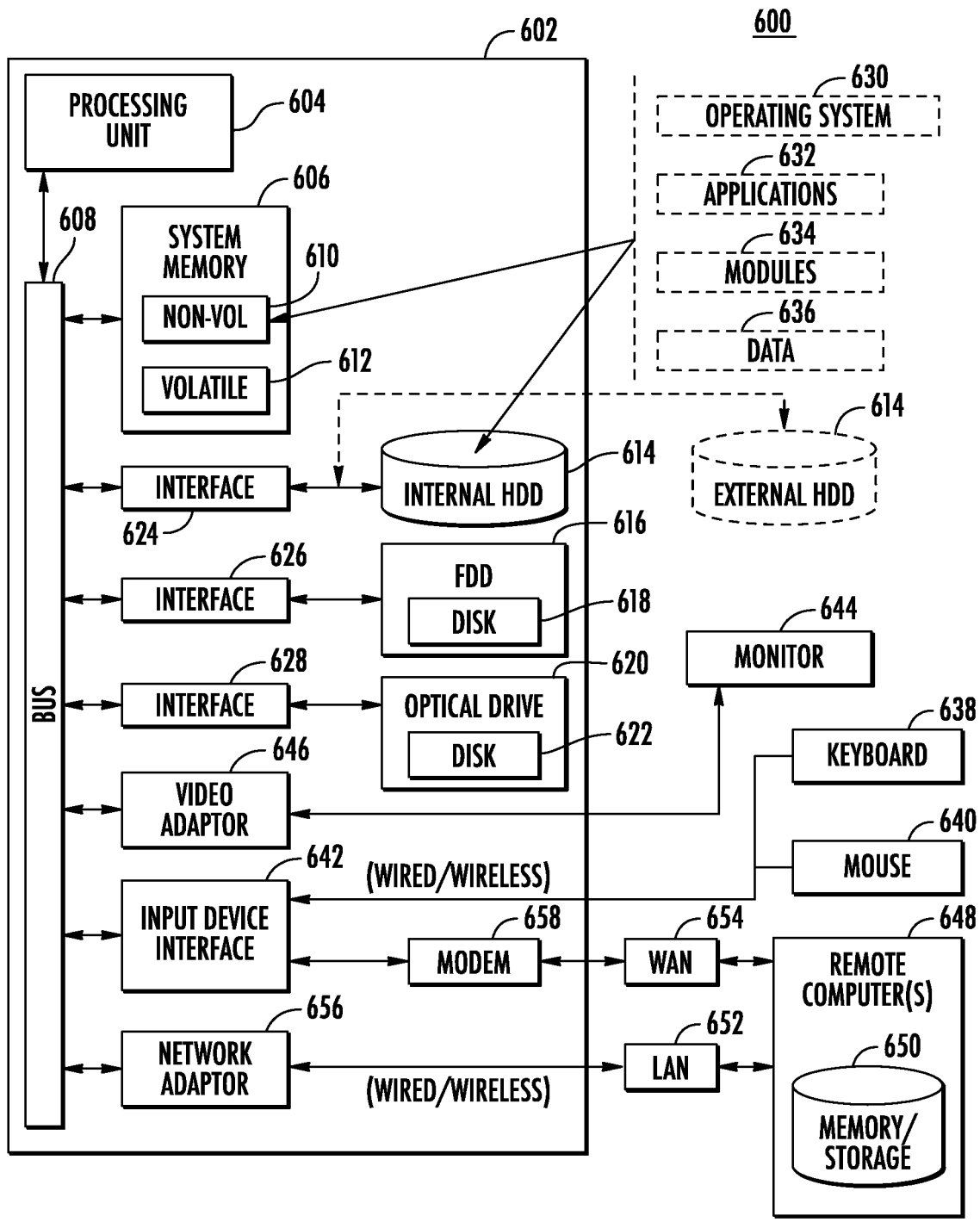
FIG. 6 illustrates an embodiment of a computing architecture.

FIG. 6 illustrates an embodiment of an exemplary computing architecture 600 suitable for implementing various embodiments as previously described. In various embodiments, the computing architecture 600 may comprise or be implemented as part of an electronic device. In some embodiments, the computing architecture 600 may be representative, for example, of computing device 110. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 606. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 606 provides an interface for system components including, but not limited to, the system memory 606 to the processing unit 604. The system bus 606 can be any of several types of bus structure that may further interconnect to a memory bus (with or without a memory controller), a peripheral bus, and a local bus using any of a variety of commercially available bus architectures. Interface adapters may connect to the system bus 606 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 616, and an optical disk drive 620 to read from or write to a removable optical disk 622 (e.g., a CD-ROM or DVD). The HDD 614, FDD 616 and optical disk drive 620 can be connected to the system bus 606 by a HDD interface 624, an FDD interface 626 and an optical drive interface 626, respectively. The HDD interface 624 for external drive implementations can include at least one or both of Universal Serial Bus (USB) and IEEE 1364 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of apparatus 105, 205, 305, and/or 405.

A user can enter commands and information into the computer 602 through one or more wire/wireless input devices, for example, a keyboard 636 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 606, but can be connected by other interfaces such as a parallel port, IEEE 1394 serial port, a game port, a USB port, an IR interface, and so forth.

A monitor 644 or other type of display device is also connected to the system bus 606 via an interface, such as a video adaptor 646. The monitor 644 may be internal or external to the computer 802. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 646. The remote computer 646 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 656, or is connected to a communications server on the WAN 654, or has other means for establishing communications over the WAN 654, such as by way of the Internet. The modem 656, which can be internal or external and a wire and/or wireless device, connects to the system bus 606 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computing device, comprising:
at least one memory;
at least one storage device; and
logic coupled to the at least one memory to perform an installation process, the logic to:
determine installation requirements for an analytical platform, the analytical platform comprising at least one of an analytical application, a database application, and a fast recovery area (FRA), and
perform a drive optimization process comprising:
performing a hardware inventory of a system to which the analytical platform is being installed, performing at least one prerequisite test based on the hardware inventory of the system and the installation requirements for the analytical platform, and determining an optimal-drives configuration for installation of the analytical platform based on a remaining free space (RFS) on the at least one storage device and based on enforcing at least one storage device installation rule, the optimal-drives configuration for installation of the analytical platform comprising custom installation location defaults for the analytical application, the database application, and the FRA determined based on a result of performing the at least one prerequisite test.

2. The computing device of claim 1, the logic to stop installation of the analytical platform responsive to a mandatory condition determined during the at least one prerequisite test.

3. The computing device of claim 2, the mandatory condition comprising insufficient RFS.

4. The computing device of claim 3, the logic to display the mandatory condition via an installation test report graphical user interface (GUI) with mandatory condition information indicating a storage device and RFS information that is a source of the mandatory condition.

5. The computing device of claim 1, the at least one storage device installation rule comprising one of analytical application installed on a separate storage location from OS, analytical application installed on a separate storage location from database application, database application installed on a separate storage location from OS, FRA installed on a separate storage location from OS, and FRA installed on a separate storage location from database application.

6. The computing device of claim 1, the logic to determine a drive partition for installation of at least one component of the analytical platform.

7. The computing device of claim 1, the logic to:
receive a user-specified installation path for at least one component of the analytical platform, and
perform the drive optimization process using the user-specified installation path for the at least one component of the analytical platform.

8. The computing device of claim 1, the at least one storage device comprising a plurality of storage devices, the logic to perform the drive optimization process to determine a plurality of options for each storage device of the plurality of storage devices.

9. A computer-implemented method to implement an installation process on at least one storage device of a computing device, comprising, via a processor of the computing device:
determining installation requirements for an analytical platform, the analytical platform comprising at least one of an analytical application, a database application, and a fast recovery area (FRA); and
performing a drive optimization process comprising:
performing a hardware inventory of a system to which the analytical platform is being installed, performing at least one prerequisite test based on the hardware inventory of the system and the installation requirements for the analytical platform, and determining an optimal-drives configuration for installation of the analytical platform based on a remaining free space (RFS) on the at least one storage device and based on enforcing at least one storage device installation rule, the optimal-drives configuration for installation of the analytical platform comprising custom installation location defaults for the analytical application, the database application, and the FRA determined based on a result of performing the at least one prerequisite test.

10. The computer-implemented method of claim 9, comprising stopping installation of the analytical platform responsive to a mandatory condition determined during the at least one prerequisite test.

11. The computer-implemented method of claim 10, the mandatory condition comprising insufficient RFS.

12. The computer-implemented method of claim 11, comprising displaying the mandatory condition via an installation test report graphical user interface (GUI) with mandatory condition information indicating a storage device and RFS information that is a source of the mandatory condition.

13. The computer-implemented method of claim 9, the at least one storage device installation rule comprising one of analytical application installed on a separate storage location from OS, analytical application installed on a separate storage location from database application, database application installed on a separate storage location from OS, FRA installed on a separate storage location from OS, and FRA installed on a separate storage location from database application.

14. The computer-implemented method of claim 9, comprising determining a drive partition for installation of at least one component of the analytical platform.

15. The computer-implemented method of claim 9, comprising:
receiving a user-specified installation path for at least one component of the analytical platform, and
performing the drive optimization process using the user-specified installation path for the at least one component of the analytical platform.

16. The computer-implemented method of claim 9, the at least one storage device comprising a plurality of storage devices,
the computer-implemented method further comprising performing the drive optimization process to determine a plurality of options for each storage device of the plurality of storage devices.

17. A non-transitory computer-readable medium storing instructions that, when executed, cause one or more processors to implement an installation process on at least one storage device of a computing device to:
determine installation requirements for an analytical platform, the analytical platform comprising at least one of an analytical application, a database application, and a fast recovery area (FRA); and
perform a drive optimization process comprising:
performing a hardware inventory of a system to which the analytical platform is being installed, performing at least one prerequisite test based on the hardware inventory of the system and the installation requirements for the analytical platform, and determining an optimal-drives configuration for installation of the analytical platform based on a remaining free space (RFS) on the at least one storage device and based on enforcing at least one storage device installation rule, the optimal-drives configuration for installation of the analytical platform comprising custom installation location defaults for the analytical application, the database application, and the FRA determined based on a result of performing the at least one prerequisite test.

18. The non-transitory computer-readable medium of claim 17, the instructions, when executed, to cause the one or more processors to implement the installation process on the at least one storage device of the computing device to: stop installation of the analytical platform responsive to a mandatory condition determined during the at least one prerequisite test, the mandatory condition comprising insufficient RFS.

19. The non-transitory computer-readable medium of claim 17, the at least one storage device installation rule comprising one of analytical application installed on a separate storage location from OS, analytical application installed on a separate storage location from database application, database application installed on a separate storage location from OS, FRA installed on a separate storage location from OS, and FRA installed on a separate storage location from database application.

20. The non-transitory computer-readable medium of claim 17, the at least one storage device comprising a plurality of storage devices,
the instructions, when executed, to cause the one or more processors to implement the installation process on the at least one storage device of the computing device to perform the drive optimization process to determine a plurality of options for each storage device of the plurality of storage devices.

* * * * *